United States Patent
Foster

(10) Patent No.: US 9,464,927 B2
(45) Date of Patent: Oct. 11, 2016

(54) MAGNETIC FLOWMETER FLOWTUBE WITH PROCESS FLUID VENTING ASSEMBLY

(71) Applicant: Rosemount Inc., Chanhassen, MN (US)

(72) Inventor: Jeffry D. Foster, St. Louis Park, MN (US)

(73) Assignee: Micro Motion, Inc., Boulder, CO (US)

( * ) Notice: Subject to any disclaimer, the term of this patent is extended or adjusted under 35 U.S.C. 154(b) by 190 days.

(21) Appl. No.: 14/502,474

(22) Filed: Sep. 30, 2014

(65) Prior Publication Data
US 2016/0091353 A1 Mar. 31, 2016

(51) Int. Cl.
*G01F 1/58* (2006.01)
(52) U.S. Cl.
CPC .................................. *G01F 1/584* (2013.01)
(58) Field of Classification Search
CPC ............. G01F 1/00; G01F 1/58; G01F 1/584
See application file for complete search history.

(56) References Cited

U.S. PATENT DOCUMENTS

| | | | | |
|---|---|---|---|---|
| 5,149,142 A * | 9/1992 | Walko | ................ | F16L 23/125 285/14 |
| 6,539,981 B1 * | 4/2003 | Kleven | .................. | G01F 1/58 138/104 |
| 6,543,811 B1 * | 4/2003 | Campbell | ................ | F16L 58/08 285/16 |
| 7,650,798 B2 | 1/2010 | Foster et al. | | |
| 2003/0159733 A1 * | 8/2003 | Ransom | .................. | F16K 24/04 137/312 |
| 2005/0052019 A1 * | 3/2005 | Schroeder | ............. | F16L 23/125 285/13 |
| 2006/0162465 A1 * | 7/2006 | Sulzer | .................... | C08G 18/10 73/861.12 |
| 2014/0097372 A1 | 4/2014 | Roth et al. | | |

FOREIGN PATENT DOCUMENTS

| | | | | |
|---|---|---|---|---|
| JP | 2009276158 A | * | 11/2009 | ............... G01F 1/58 |
| JP | 2010-002249 A | | 1/2010 | |
| JP | 2010002249 A | * | 1/2010 | ............... G01F 1/58 |

OTHER PUBLICATIONS

International Search Report and Written Opinion for International Application No. PCT/US2015/051738, date of mailing: Dec. 14, 2015, date of filing: Sep. 23, 2015, 14 pages.

* cited by examiner

*Primary Examiner* — Nguyen Ha
(74) *Attorney, Agent, or Firm* — Katherine M. Scholz; Kelly, Holt & Christenson, PLLC

(57) ABSTRACT

A magnetic flowmeter flowtube assembly includes a conduit having an inside diameter, a fluoropolymer liner disposed within and extending through the conduit, and a pair of electrodes mounted relative to the liner to measure a voltage induced within a process fluid flowing through the liner. A venting assembly provides a process fluid vent path from the inside diameter of the conduit to an exterior of the flowtube assembly.

18 Claims, 5 Drawing Sheets

MAGNETIC FLOWMETER FLOWTUBE WITH PROCESS FLUID VENTING ASSEMBLY

BACKGROUND

Magnetic flowmeters (or mag meters) measure flow by Faraday induction, an electromagnetic effect. The magnetic flowmeter energizes one or more coils which generate a magnetic field across a section of a flowtube assembly. The magnetic field induces an electromotive force (EMF) across the flow of conductive process fluid through the flowtube assembly. The resulting potential developed across the conductive fluid is measured using a pair of electrodes that extends into the flowing process fluid. Alternatively, some magnetic flowmeters employ capacitive coupling between the electrodes and the process fluid such that the EMF can be measured without direct contact. In any event, the flow velocity is generally proportional to the induced EMF, and the volumetric flow is proportional to the flow velocity and the cross sectional area of the flowtube.

Magnetic flowmeters are useful in a variety of fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive fluid processing facilities. Magnetic flow meters are often employed in the hydrocarbon fuel industry, which sometimes employs hydraulic fracturing techniques utilizing abrasive and corrosive slurries.

Magnetic flowmeters can be specified with a variety of different lining and/or electrode materials to suit the application for which the magnetic flowmeter is employed. Examples of lining materials include polytetrafluoroethylene (PTFE); ethylene tetrafluoroethylene (ETFE); PFA; polyurethane; neoprene; and linatex rubber, as well as other materials. Electrodes may be constructed from any suitable material including 316 L stainless steel; nickel alloy 276; tantalum; platinum/iridium blends; titanium; as well as other suitable materials.

Fluoropolymer lining materials such as PTFE, ETFE, and PFA are often selected for superior resistance to chemical attack and/or high temperature operation. In at least some applications, fluoropolymer-based liners are being subjected to increased application demands. For example, in the oil and gas industry, some fluoropolymer liners are being subjected to higher pressures and/or temperatures. Such conditions create a challenge in designing and manufacturing robust magnetic flowmeter devices with fluoropolymer liners. This is because at least some fluoropolymers, such as PTFE, experience "cold flow" where the lining material expands and contracts under pressure and temperature. Such expansion/contraction can cause the process fluid to leak.

The discussion above is merely provided for general background information and is not intended to be used as an aid in determining the scope of the disclosed subject matter.

SUMMARY

In one embodiment, a magnetic flowmeter flowtube assembly includes a conduit having an inside diameter, a liner disposed within and extending through the conduit, and a pair of electrodes mounted relative to the liner to measure a voltage induced within a process fluid flowing through the liner. A venting assembly provides a process fluid vent path from the inside diameter of the conduit to an exterior of the flowtube assembly.

In one embodiment, a method of venting a magnetic flowmeter includes providing a flowtube assembly with a conduit, the conduit having an inner surface, an outer surface, and a hole formed between the inner and outer surfaces. The method also includes inserting a non-conductive liner into the conduit and providing a venting assembly in fluid communication with the hole.

In one embodiment, a magnetic flowmeter flowtube assembly includes a conduit having an inner surface, an outer surface, and a hole formed in the conduit between the inner surface and the outer surface. The assembly also includes a non-conductive liner disposed within and extending through the conduit and a pair of electrodes mounted relative to the liner to measure a voltage induced within a process fluid flowing through the liner. The assembly also includes a fitting coupled to the conduit proximate the hole formed in the conduit and a porous metal plug disposed in the fitting.

DETAILED DESCRIPTION OF ILLUSTRATIVE EMBODIMENTS

Figure 1:
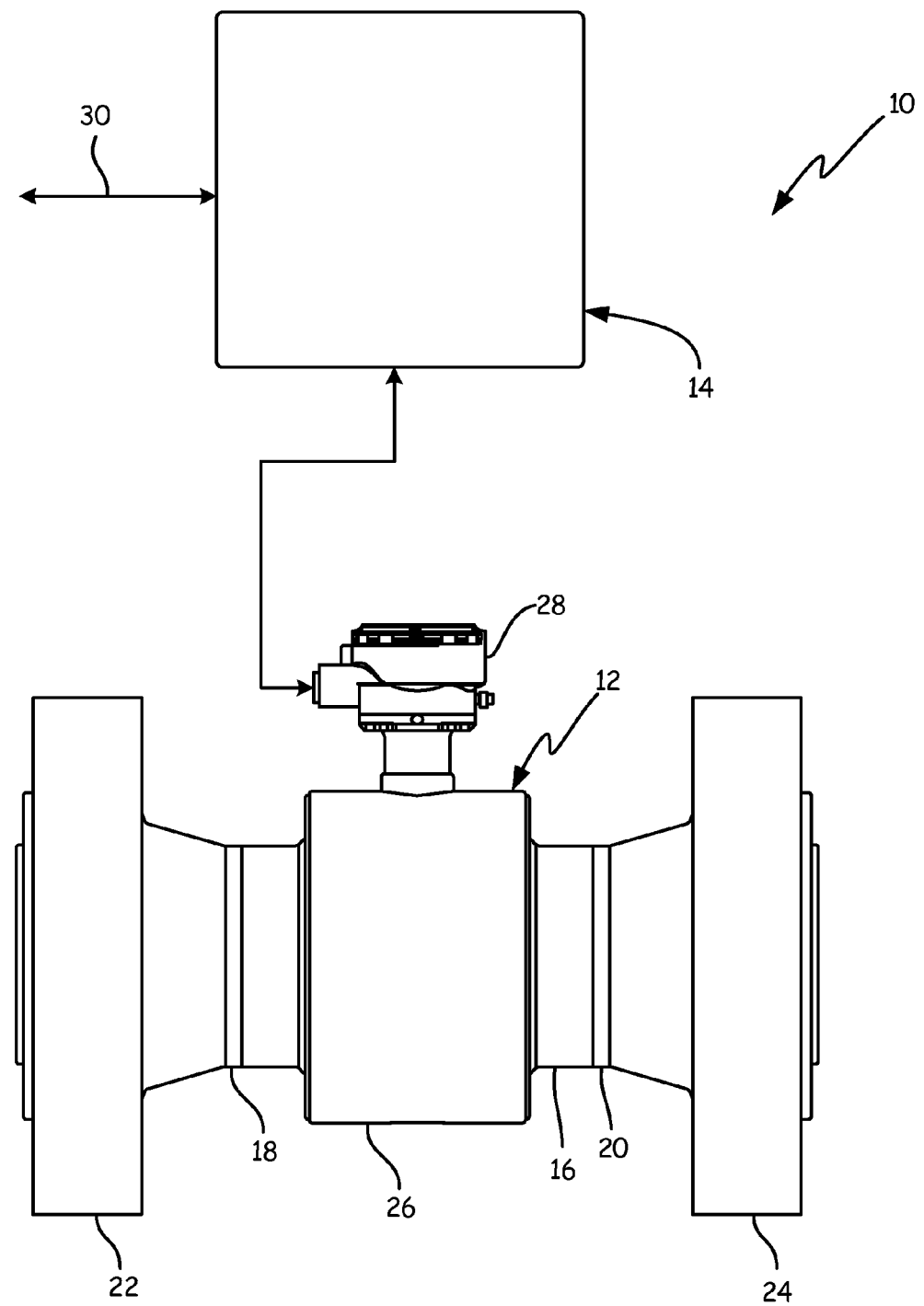
FIG. 1 is a diagrammatic view of a magnetic flowmeter with which embodiments of the present invention are particularly useful.

FIG. 1 is a diagrammatic view of a magnetic flowmeter with which embodiments described herein are useful. Magnetic flowmeter 10 includes flowtube assembly 12 coupled to transmitter electronics 14. Flowtube assembly 12 includes a section of conduit 16 having ends 18 and 20 coupled to respective flanges 22 and 24. Each of flanges 22, 24 includes mounting holes for mounting to suitable pipe flanges such that process fluid flows through conduit 16. Flanges 22, 24 generally attach to conduit 16 by welding conduit 16 to a neck of the flange. Such coupling allows for the transfer of stress from the flange 22, 24 to conduit 16.

Flowtube assembly 12 also generally includes a coil/electrode portion 26 that contains one or more electromagnetic coils driven by transmitter electronics 14 to generate an electromagnetic field across conduit 16. Electrodes disposed within conduit 16 contact the process fluid and are used to sense the electromotive force (EMF) generated across the process fluid in response to the induced magnetic field. The coil(s) and electrodes of flowtube assembly 12 are generally coupled to a terminal block within housing 28, which is then operably coupled to transmitter electronics 14. Transmitter electronics 14 generally includes a controller or microprocessor that is configured to provide an indication of process fluid flow based on the measured EMF. Transmitter electronics 14 also generally includes communication circuitry to convey such process fluid flow information to one or more remote devices as indicated by bi-directional arrow 30. Such communication can be in the form of wired process communication or wireless process communication.

Figure 2:
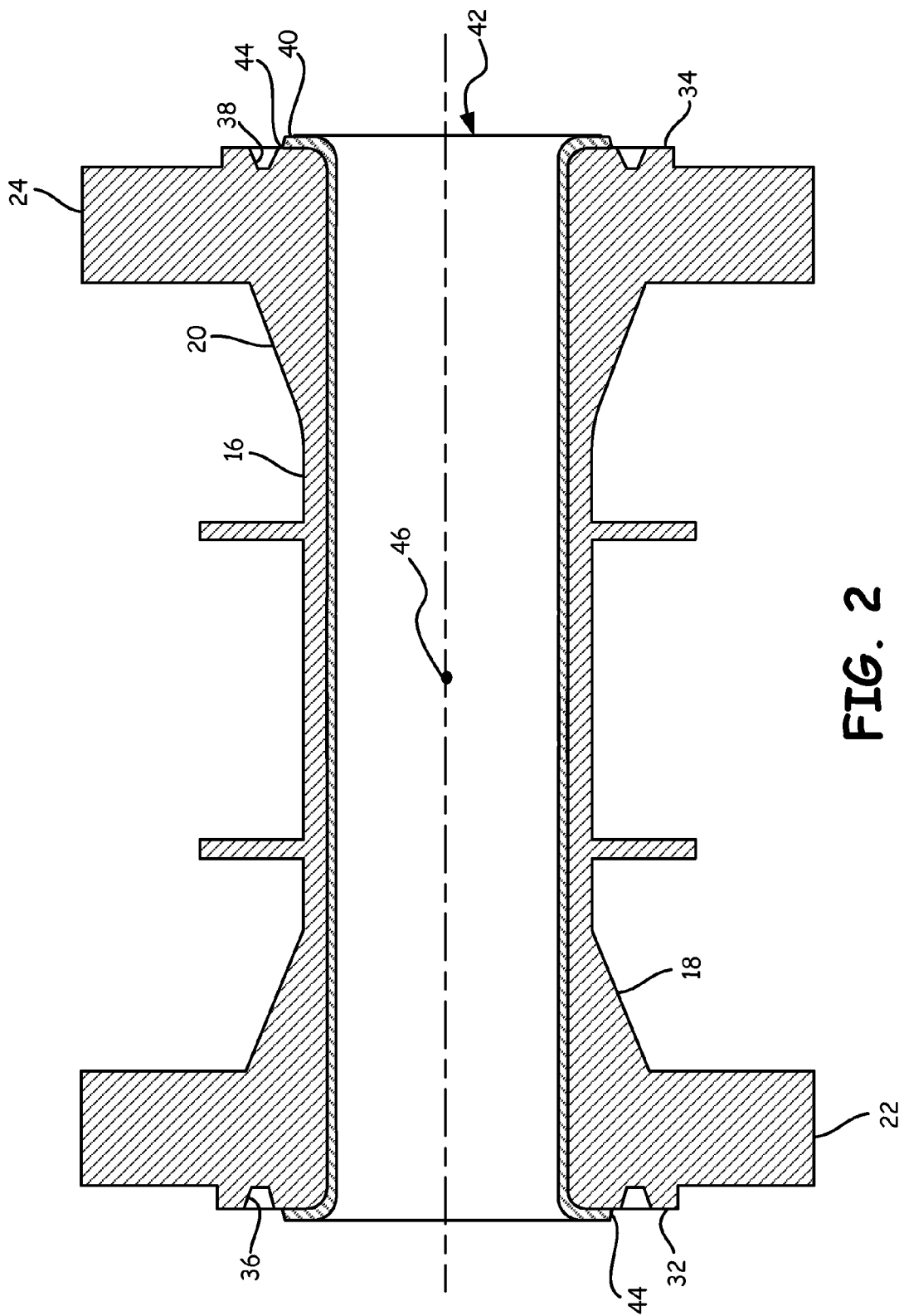
FIG. 2 is a diagrammatic cross-sectional view illustrating a fluoropolymer liner disposed within a flowtube assembly having a pair of flanges, under one embodiment.

FIG. 2 is a diagrammatic cross-sectional view illustrating a liner 42 disposed within a conduit 16 that is coupled to a pair of flanges 22, 24. In the illustrated embodiment, liner 42 is formed of a non-conductive material that insulates conduit 16 from the process fluid. In one example, liner 42 is formed of a fluoropolymer, such as, but not limited to, polytetrafluoroethylene (PTFE).

Each of flanges 22, 24 includes a sealing face 32, 34, respectively, that is configured to engage a seal ring and thereby fluidically couple to an opposing pipe flange. In some cases, the seal may be a ring-type seal which is received in grooves 36, 38 in order to generate a high-pressure metal-to-metal connection. While the utilization of an RTJ sealing ring provides a robust seal, it also creates a gap between outside diameter 40 of liner 42 and the inside diameter of the sealing ring. This gap allows the pressurized process fluid to engage or otherwise contact interface 44 between the fluoropolymer liner 42 and the flanges 22, 24. Generally, liner 42 is interference fit into the inside diameter of conduit 16, and thus there is no bond between liner 42 and conduit 16.

Embodiments of the present disclosure generally provide a venting assembly configured to vent process fluid that leaks into a space between liner 42 and conduit 16 (e.g., process fluid that breaches interfaces 44, diffuses through liner 42, and/or otherwise leaks between liner 42 and the inside diameter of conduit 16). For example, under some cold flow conditions, liner 42 will expand or contract and can generate leak paths at the flange faces. Once process fluid breaches interfaces 44, it can move along the inside diameter of conduit 16 to reach electrodes 46 very quickly. When the process fluid reaches the electrodes, electrical isolation of such electrodes is defeated and the electrodes are no longer able to carry the induced voltage from the process fluid to transmitter electronics 14.

Figure 3:
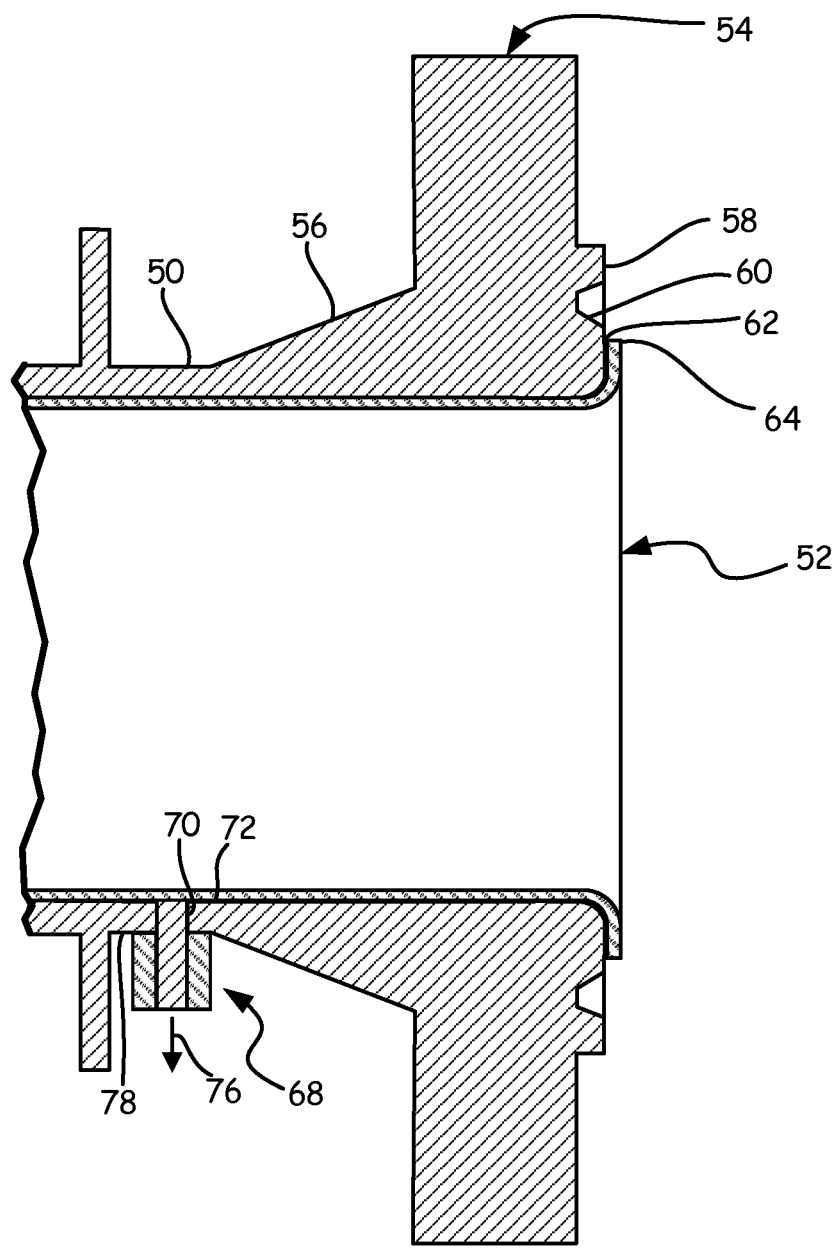
FIG. 3 is a diagrammatic cross-sectional view of a portion of a flowtube having a venting assembly, in accordance with an embodiment of the present invention.

FIG. 3 is a diagrammatic cross-sectional view of a portion of a flowtube having a venting assembly that provides a vent path 76 that drains leaking process fluid to atmosphere, in accordance with one embodiment. The flowtube has a section of conduit 50, a liner 52 disposed within conduit 50, and a flange 54 coupled to an end 56 of conduit 50. The flowtube includes electrodes (not shown in FIG. 3) and a second flange (not shown in FIG. 3) that is coupled to a second end of conduit 50. In one example, conduit 50 and liner 52 are similar to conduit 16 and liner 42 discussed above with respect to FIG. 2. Further, in one example, flange 54 is similar to flange 24, shown in FIG. 2, in that it includes a raised face 58 and RTJ groove 60. An interface 62 is provided between outside diameter 64 of liner 52 and face 58 of flange 54. Accordingly, process fluid, in some situations, may breach interface 62 thereby moving along the inside diameter 72 of conduit 50 toward the electrodes.

As shown in FIG. 3, venting assembly 68 is coupled to conduit 50 proximate a hole 70 formed in conduit 50, for example by a drilling process. While venting assembly 68 is illustrated as being coupled to a bottom of conduit 50 proximate end 56, it is noted that venting assembly 68 can be positioned at any other suitable location along conduit 50. Further, in one example a plurality of venting assemblies can be coupled to conduit 50.

Venting assembly 68 provides a path for the leaked process fluid to leave the flowtube assembly, to prevent the process fluid from building up between liner 52 and the inside diameter of conduit 50. For example, process fluid may breach interface 62 or diffuse through liner 52 into a space between liner 52 and the inside diameter of conduit 50. In the illustrated embodiment, the leaked process fluid flows into hole 70 formed in conduit 50 and through venting assembly 68. Venting assembly 68 includes at least one resistive flow path 76 that allows the process fluid to drain from hole 70 to atmosphere, but at a slower rate than if venting assembly 68 were not present at hole 70. In one embodiment, venting assembly 68 comprises at least one tortuous flow path.

For sake of illustration, without use of venting assembly 68 at hole 70, only the liner 52 would be positioned between the process fluid and the flow meter environment. Thus, in this instance, a failure of liner 52 could cause a release of high pressure process fluid from hole 70 into the environment, which could pose a risk to workers in the vicinity of the flowtube assembly, for example. In one embodiment, use of venting assembly 68 with the flowtube assembly satisfies industry standard pressure retention tests, such as burst testing at three times burst pressure as called out in IEC 61010.

Figure 4:
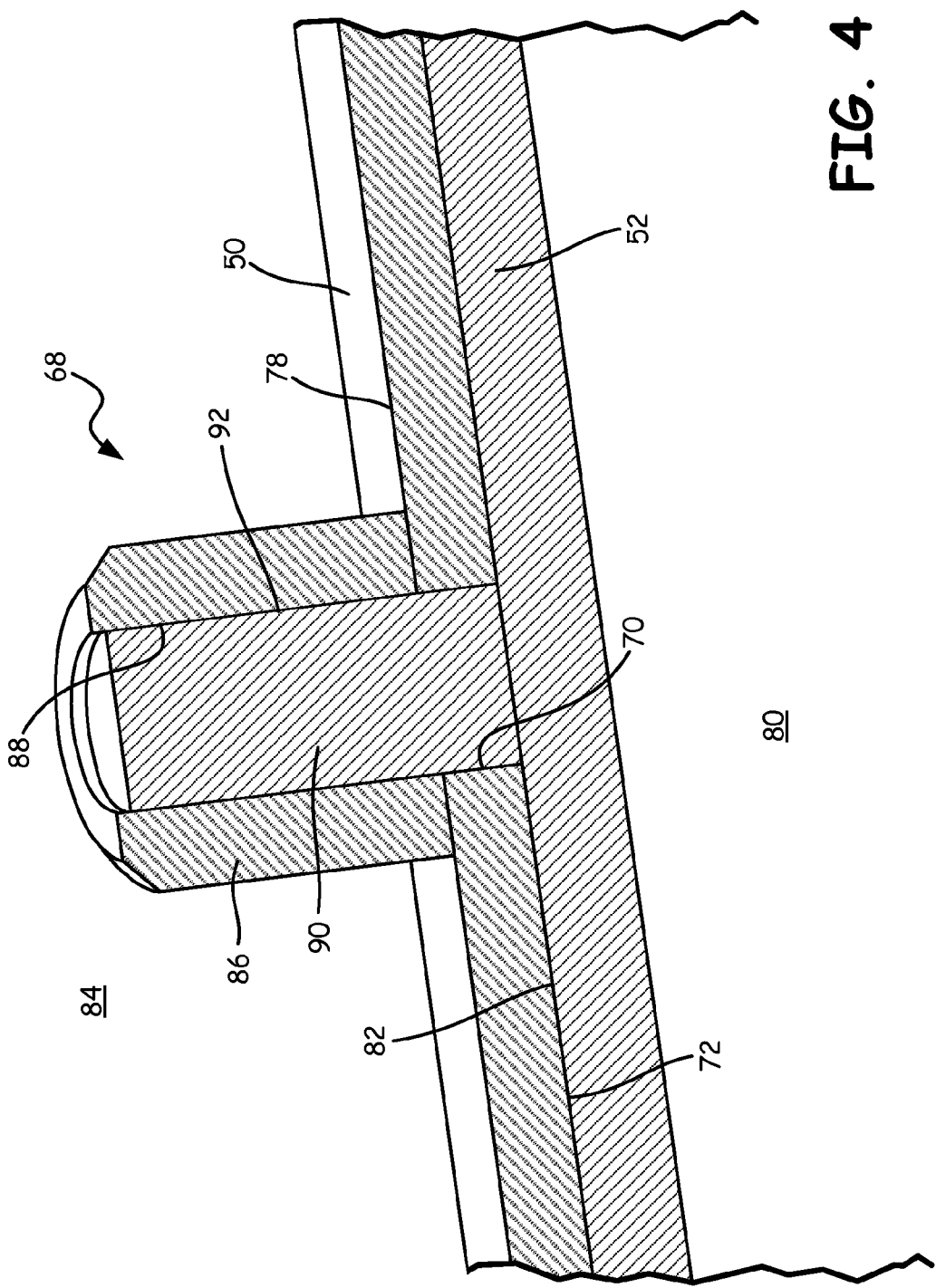
FIG. 4 is a diagrammatic cross-sectional perspective view of the venting assembly shown in FIG. 3, in accordance with an embodiment of the present invention.

FIG. 4 is a diagrammatic cross-sectional perspective view of venting assembly 68. Venting assembly 68 is mounted to an outer surface 78 of conduit 50 proximate the hole 70 formed between the inner surface (i.e., inside diameter 72) and outer surface 78. Liner 52 carries a process fluid 80 flowing therethrough. As similarly discussed above, during operation some of the process fluid can leak into a space between the outer diameter 82 of liner 52 and the inner diameter 72 of conduit 50. Venting assembly 68 provides a venting path for the process fluid to drain into the environment or atmosphere 84.

In the illustrated example, hole 70 is approximately one-eighth inch to one-quarter inch in diameter. However, any suitable size can be used. A fitting 86 is located over hole 70 and secured to the outer surface 78 of conduit 50, for example by welding or any other suitable attachment. Fitting 86 has a corresponding bore 88 that is aligned with hole 70.

A plug 90 is positioned within bore 88 of fitting 86. Plug 90 is configured to provide a resistive path for the process fluid to drain into the environment 84. In the illustrated example, plug 90 is formed of a porous metal, such as, but not limited to, stainless steel made from a powder metal process. The porous metal plug has a lower density than a corresponding non-porous plug, and is configured to allow, but provide some resistance to, a flow of process fluid through bore 88.

In the example of FIG. 4, fitting 86 comprises a threaded nipple, where a series of threads are disposed along surfaces of bore 88. Plug 90 has corresponding threads along its outer surface enabling plug 90 to be threaded into bore 88. In the illustrated example, plug 90 is threaded into fitting 86 until an end of plug 90 touches the outer surface 82 of liner 52, which can provide a structural backing for liner 52. To prevent plug 90 from backing out of the threaded engagement with fitting 86 (for example, due to thermal cycling and/or vibration), in one embodiment plug 90 is secured to fitting 86 by tack welding or other suitable attachment.

In another embodiment, plug 90 of venting assembly 68 is formed with a solid, non-porous material. The resistive flow path through venting assembly 68 is formed along the thread interface 92 between plug 90 and fitting 86. In one example, the threads of fitting 86 and plug 90 can be of different sizes, thereby forming a gap therebetween that allows passage of process fluid through the thread interface 92.

Figure 5:
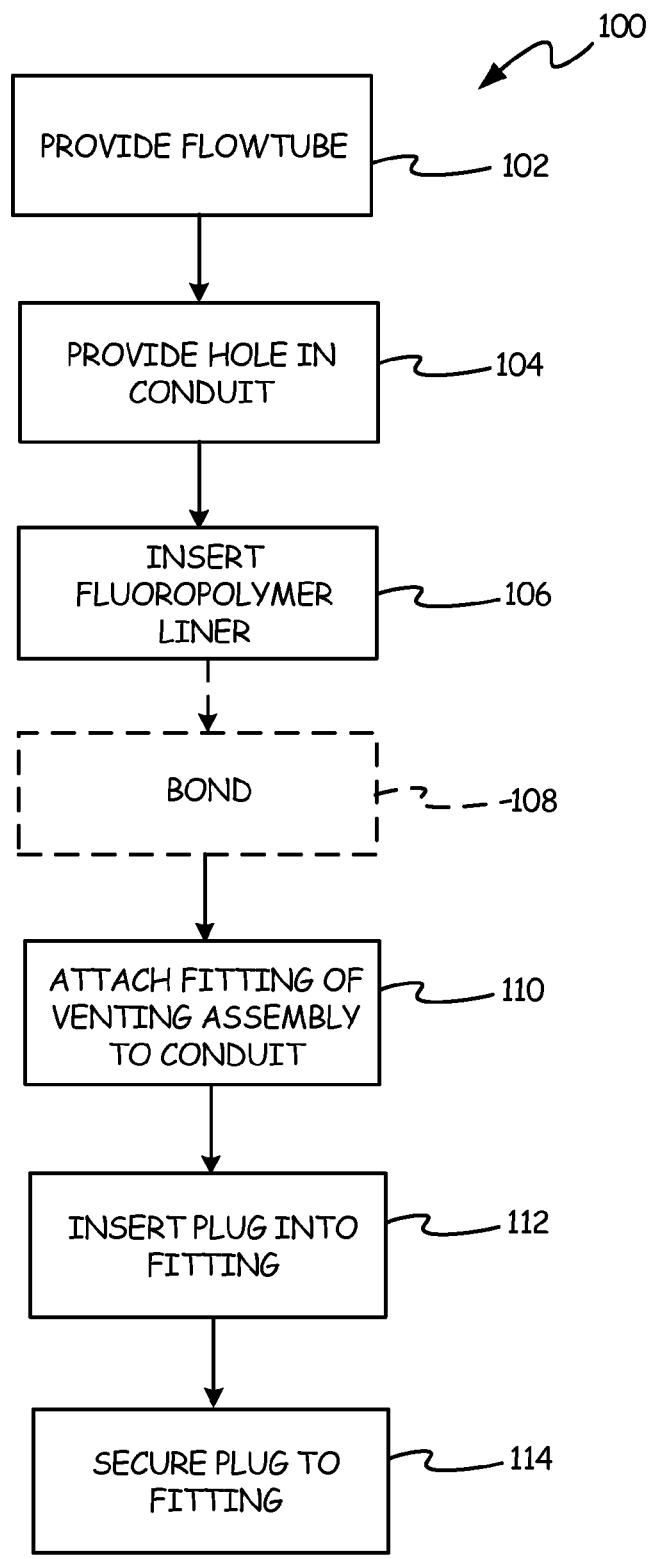
FIG. 5 is a flow diagram of a method of venting a magnetic flow meter, in accordance with an embodiment of the present invention.

FIG. 5 is a flow diagram of a method 100 of venting a magnetic flow meter. For sake of illustration, but not by limitation, method 100 will be described in the context of the example flow meter illustrated in FIGS. 3 and 4.

At block 102, a flowtube is provided. The flowtube comprises a conduit (e.g., conduit 50) having inner and outer surfaces. At block 104, a hole (e.g., hole 70) is provided in conduit 50. For example, hole 70 is made by drilling through conduit 50. At block 106, a liner (e.g., liner 52) is inserted into the conduit 50. Optionally, block 108 can also be performed to chemically bond liner 52 to conduit 50 for additional sealing at the liner/conduit interface(s).

At block 110, a fitting (e.g., fitting 86) having a bore (e.g., bore 88) is attached to conduit 50. For example, fitting 86 can be welded to the outer surface 78 of conduit 50. At block 112, a plug (e.g., plug 90) is inserted into fitting 86. At block 114, the plug 90 is secured to fitting 86 (e.g., by tack welding) to prevent plug 90 from backing out of bore 88.

While the blocks of method 100 have been illustrated and discussed in a particular arrangement, the illustrated arrangement is not intended to imply any particular order of the blocks. The blocks can be performed in any suitable order. For example, in one embodiment, one or more of blocks 110, 112 and 114 can be performed before blocks 104 and/or 106.

Although the present invention has been described with reference to preferred embodiments, workers skilled in the art will recognize that changes may be made in form and detail without departing from the spirit and scope of the invention.

What is claimed is:

1. A magnetic flowmeter flowtube assembly comprising:
a conduit having an inside diameter;
a liner disposed within and extending through the conduit;
a pair of electrodes mounted relative to the liner to measure a voltage induced within a process fluid flowing through the liner;
a venting assembly providing a process fluid vent path from the inside diameter of the conduit to an exterior of the flow tube assembly; and
wherein the venting assembly comprises a porous metal plug that is disposed within a fitting attached to the conduit.

2. The magnetic flowmeter flowtube assembly of claim 1, wherein the venting assembly is configured to vent leaked process fluid, that leaks between the liner and the conduit, to the environment of the flowtube assembly.

3. The magnetic flowmeter flowtube assembly of claim 1, wherein the process fluid vent path is at least partially resistive to process fluid flow therethrough.

4. The magnetic flowmeter flowtube assembly of claim 1, wherein the process fluid vent path comprises at least one tortuous path.

5. The magnetic flowmeter flowtube assembly of claim 1, wherein the fitting is attached to the conduit over a hole formed in the conduit between the inside diameter and an outer surface of the conduit.

6. The magnetic flowmeter flowtube assembly of claim 5, wherein the fitting comprises a threaded nipple that threadably receives the porous metal plug.

7. The magnetic flowmeter flowtube assembly of claim 1, and further comprising at least one coil disposed to generate an electromagnetic field relative to process fluid flowing through the liner.

8. The magnetic flowmeter flowtube assembly of claim 7, and further comprising transmitter electronics coupled to the pair of electrodes and the at least one coil.

9. The magnetic flowmeter flowtube assembly of claim 1, wherein a first neck flange is located at a first end of the conduit and a second neck flange is located at a second end of the conduit.

10. The magnetic flowmeter flowtube assembly of claim 1, wherein the liner is formed of a non-conductive material.

11. The magnetic flowmeter flowtube assembly of claim 10, wherein the material is a fluoropolymer.

12. The magnetic flowmeter flowtube assembly of claim 11, wherein the fluoropolymer is polytetrafluoroethylene (PTFE).

13. A method of venting a magnetic flowmeter, the method comprising:
providing a flowtube assembly with a conduit, the conduit having an inner surface, an outer surface, and a hole formed between the inner and outer surfaces;
inserting a non-conductive liner into the conduit;
providing a venting assembly in fluid communication with the hole;
securing a fitting to the outer surface of the conduit, such that the fitting is located proximate the hole; and
inserting a plug into the fitting.

14. The method of claim 13, and further comprising:
drilling the hole through a portion of the conduit.

15. The method of claim 14, wherein providing the venting assembly comprises coupling the venting assembly to the outer surface of the conduit.

16. The method of claim 15, wherein the liner is inserted into the conduit before the venting assembly is coupled to the outer surface of the conduit.

17. The method of claim 15, wherein the fitting comprises a threaded bore and the plug is formed of a porous metal, wherein the method comprises:
threading the porous metal plug into the threaded bore.

18. A magnetic flowmeter flowtube assembly comprising:
a conduit having an inner surface, an outer surface, and a hole formed in the conduit between the inner surface and the outer surface;
a non-conductive liner disposed within and extending through the conduit;
a pair of electrodes mounted relative to the liner to measure a voltage induced within a process fluid flowing through the liner;
a fitting coupled to the conduit proximate the hole formed in the conduit; and
a porous metal plug disposed in the fitting.

* * * * *